(12) United States Patent
Zhang et al.

(10) Patent No.: US 10,129,749 B2
(45) Date of Patent: Nov. 13, 2018

(54) METHOD AND DEVICE FOR ACQUIRING RESPONSE MESSAGE, METHOD AND DEVICE FOR ROUTING RESPONSE MESSAGE, AND SYSTEM FOR ACQUIRING RESPONSE MESSAGE AND ROUTING RESPONSE MESSAGE

(71) Applicant: ZTE CORPORATION, Shenzhen, Guangdong Province (CN)

(72) Inventors: Xuejun Zhang, Shenzhen (CN); Jianxiang Wang, Shenzhen (CN); Rong Song, Shenzhen (CN); Jin Zhang, Shenzhen (CN); Yijun Guo, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 15/512,002

(22) PCT Filed: Jan. 30, 2015

(86) PCT No.: PCT/CN2015/072006
§ 371 (c)(1),
(2) Date: Mar. 16, 2017

(87) PCT Pub. No.: WO2015/184840
PCT Pub. Date: Dec. 10, 2015

(65) Prior Publication Data
US 2017/0303124 A1    Oct. 19, 2017

(30) Foreign Application Priority Data
Sep. 30, 2014 (CN) .......................... 2014 1 0526406

(51) Int. Cl.
*H04W 12/06* (2009.01)
*H04W 8/08* (2009.01)
(Continued)

(52) U.S. Cl.
CPC .......... *H04W 12/06* (2013.01); *H04L 45/304* (2013.01); *H04W 8/082* (2013.01); *H04W 40/02* (2013.01); *H04W 48/16* (2013.01)

(58) Field of Classification Search
CPC ....... H04W 12/06; H04W 36/24; H04W 4/14; H04W 12/12; H04W 4/02; H04W 8/082;
(Continued)

(56) References Cited

U.S. PATENT DOCUMENTS

| 9,668,135 | B2 * | 5/2017 | McCann | ................ H04W 12/06 |
| 2007/0097892 | A1 * | 5/2007 | Tsang | ...................... H04L 45/26 370/310 |

(Continued)

FOREIGN PATENT DOCUMENTS

| CN | 101217810 | 7/2008 |
| CN | 101283523 | 10/2008 |

OTHER PUBLICATIONS

International Search Report, International application No. PCT/CN2015/072006, dated Jul. 2, 2015.

*Primary Examiner* — Nizar Sivji
(74) *Attorney, Agent, or Firm* — Koppel, Patrick, Heybl & Philpott

(57) ABSTRACT

A method and device for acquiring a response message, a method and device for routing the response message, and a system for acquiring the response message and routing the response message are disclosed. The method includes steps that: a source node sends a service request message to a second group of nodes via a first group of DRA nodes; and the source node acquires the service response message returned by the destination node via the second group of DRA nodes.

18 Claims, 13 Drawing Sheets

(51) Int. Cl.
*H04W 40/02* (2009.01)
*H04W 48/16* (2009.01)
*H04L 12/725* (2013.01)

(58) Field of Classification Search
CPC .. H04W 40/02; H04W 48/16; H04L 65/1016; H04L 65/1073; H04L 63/0407; H04L 41/12; H04L 2209/16; H04L 12/2834; H04L 12/66; H04L 45/304
See application file for complete search history.

(56) References Cited

U.S. PATENT DOCUMENTS

| | | | |
|---|---|---|---|
| 2010/0299451 A1* | 11/2010 | Yigang | H04L 45/306 709/241 |
| 2011/0202676 A1* | 8/2011 | Craig | H04L 63/20 709/238 |
| 2011/0302244 A1* | 12/2011 | McCann | H04L 63/0407 709/204 |
| 2012/0155389 A1* | 6/2012 | McNamee | H04L 45/306 370/328 |
| 2012/0155470 A1* | 6/2012 | McNamee | H04L 69/22 370/392 |
| 2013/0279406 A1 | 10/2013 | Merino Vazquez et al. | |
| 2014/0181952 A1* | 6/2014 | McCann | H04L 63/0263 726/13 |
| 2014/0297888 A1* | 10/2014 | McCann | H04L 45/70 709/243 |
| 2015/0149656 A1* | 5/2015 | McMurry | H04L 45/00 709/238 |

* cited by examiner

Message transmission model of OSI

Diameter message forwarding model 1

Diameter message forwarding model 2

METHOD AND DEVICE FOR ACQUIRING RESPONSE MESSAGE, METHOD AND DEVICE FOR ROUTING RESPONSE MESSAGE, AND SYSTEM FOR ACQUIRING RESPONSE MESSAGE AND ROUTING RESPONSE MESSAGE

TECHNICAL FIELD

The disclosure relates to the field of communications, and in particular to a method and device for acquiring a response message, a method and device for routing the response message, and a system for acquiring the response message and routing the response message.

BACKGROUND

At present, Requests For Comments (RFC) 3588 and 6733, two versions of a Diameter base protocol' released by an Internet Engineering Task Force (IETF), provide a universal Authentication, Authorization and Accounting (AAA) signaling support for a Long Term Evolution (LTE)/Evolved Packet Core (EPC)/Policy and Charging Control (PCC) network. It is defined in the 'Diameter base protocol' that a role of a Diameter node in a network is various types of agents, in which the various types of agents may include a Relay agent, a proxy agent, a redirect agent and a translate agent, each type of agents maintain a transaction state, and each type of agents except relay agents also maintain a session state.

Because an increasing number of users are using a fourth generation of mobile telecommunication technology (4G), there is an explosive increase in a quantity of the Diameter signaling in an LTE/EPC/PCC network. To deal with this situation, operators construct, by imitating an SS7 signaling network, a Diamater signaling network with Diameter routing agents (DRA) to dredge Diameter signaling.

FIG. 1 is a schematic diagram illustrating a construction of a network-over-network (that is, a Diameter signaling transfer network) over an IP network according to the related art. As shown in FIG. 1, service nodes can directly access each other via a Diameter signaling even in an absence of a DRA. Thus, a DRA signaling transfer network is a network-over-network constructed on an Internet Protocol (IP) bearing network. FIG. 2 is a schematic diagram illustrating a division of a Diameter signaling transfer network into an international layer and a domestic layer according to the related art. As shown in FIG. 2, Diameter signaling networks are classified into international Diameter signaling networks and domestic Diameter signaling networks, a Update Location Request (ULR) of a Mobility Management Entity (MME) located in a roamed country is transferred to an iDRA1 of an international DRA signaling transfer network located in the roamed country via a DRA signaling transfer network of a roamed country, then subsequently transferred to an iDRA2 located in a home country and a DRA signaling transfer network of the home country and last delivered to a Home Subscriber Server (HSS) in the home country, and in FIG. 2, a ULR message is transferred by DRAs for six times.

Diameter nodes are coupled with each other based on a Stream Control Transmission Protocol (SCTP) or connected with each other based on a Control Transmission Protocol (TCP) to serve as a data bearing link, Diameter nodes can negotiate with each other about capability through an interaction of a Capabilities Exchange Request (CER) message and a Capabilities Exchange Answer (CEA) message, and diameter nodes can detect and restore a signaling link through the interaction of a Device Watchdog Request (DER) message and a Device Watchdog Answer (DEA) message, thereby forming a Diameter signaling link layer. A Realm Routing Table provides a network route for a Diameter request message; a universal implementation framework is provided for each application interface through a Diameter transaction processing (a Diameter transaction may include a request message and a corresponding response message) and a Diameter session processing (a Diameter session may include one or more transactions which have the same Session ID). FIG. 3 is a schematic diagram illustrating protocol layers of a DRA network based on an OSI model according to the related art. As shown in FIG. 3, refer to a seven-layer model proposed by an International Organization for Standardization (ISO) for Open Systems Interconnect (OSI), SCTP, which belongs to a transaction layer in an IP network, is only a part of a signaling link layer in a Diameter signaling transfer network or a SigTran network. A Realm Routing Table in a DRA network layer only provides a route for a request message, an ACK message is returned along a path along which the request message is transmitted, conducting no route analysis for the ACK message.

In addition to the seven-layer model for the OSI, the ISO also provides a standard model for a transfer of a message in a network. When a message is transferred in a network, an intermediate node (that is, a signaling transfer node) only provides functions of a network layer, and only transaction layers and layers above transaction layers are 'end-to-end'. FIG. 4 is a schematic diagram illustrating a standard model for a transfer of a signaling between service nodes based on an OSI model according to the related art. As shown in FIG. 4, intermediate nodes can transfer a signaling through a network layer, and only transaction layers and layers above transaction layers are 'end-to-end'. IP networks, SS7 networks and SigTran networks all conform to this model.

However, in a case where a network is constructed with Diameter nodes, apart from functioning as an intermediate node, a DRA also functions as a transaction layer and even a session layer.

FIG. 5 is a schematic diagram illustrating a signaling transfer mode 1 used in the related art to transfer a signaling between Diameter service nodes through a DRA which only maintains a transaction state. As shown in FIG. 5, an intermediate node forwards a message on a transaction layer and maintains a processing of the transaction layer. FIG. 6 is a schematic diagram illustrating a signaling transfer mode 2 used in the related art to transfer a signaling between Diameter service nodes through a DRA which only maintains a transaction state and a session state. As shown in FIG. 6, an intermediate node forwards a message on a session layer and maintains a processing of a transaction layer and that of a session layer. However, functions of a network layer function are not completely provided in either of FIG. 5 and FIG. 6, that is, a response message needs to be returned along a path along which a request message is transmitted but not routed separately.

A provision of transaction management by a DRA which is a signaling transfer node is actually a defect. Because a DRA needs to maintain a transaction state, all the transactions born by the DRA fail once the DRA is out of service. To cope with this problem, a currently adoptable scheme is as follows: for a failed transaction, a Diameter client or a DRA resends a transaction request message (in a case where a timer for waiting for a Diameter response expires) or reselects a route (in a case where a response carrying a failure code is received when waiting for an ACK response) to select another DRA node for another attempt.

A problem that a Diameter response message cannot be routed separately is solved through the message being resent on a transaction layer or a route reselection scheme has the following defects:

(1) when a DRA serving as an intermediate node is out of service, transaction resources corresponding to all the intermediate nodes and all the service nodes passed by any transaction maintained by the DRA are temporarily suspended until a transaction protection timer of each of these nodes expires or a failure ACK message is received. Because a out-of-service DRA may synchronously transfer thousands and tens of thousands of transactions, this temporary suspension affects transaction resources of all the nodes in the whole Diameter network;

(2) once a transaction timer expires, a Diameter client or a DRA node will resend a request message (a flag 'N' is set for a resent request message), a great number of resent request messages will cause a big impact to the whole Diameter signaling network. When the out-of-service DRA has a load sharing node, then the load sharing node bears, apart from a load of the load sharing node, a load of the out-of-service DRA as well as a signaling load caused by a resending of each message, thus, the load is sharply increased by three times in a short time. An impact to a network is worse when resending is launched for many times or a plurality of nodes conducts a resending operation;

(3) a transaction resource (and a session resource) of a DRA node may become a bottleneck and consequentially become an unintentional or a hostile attacker. For example, a Home Location Register (HLR) making no response to an REQ message is equivalent to a Deny of Service (DoS) attack which can occupy all transaction resources within several seconds and consequentially disenable a normal forwarding of another transaction.

SUMMARY

The embodiments of the disclosure provide a method and device for acquiring a response message, a method and device for routing the response message, and a system for acquiring the response message acquiring and routing the response message, so as to at least address a problem existing in the related art that a problem that a Diameter response message cannot be routed separately is solved through a message resending of a transaction layer or a route reselection scheme has a big defect.

In an embodiment of the disclosure, a method for acquiring a response message is provided, and the method for acquiring the response message includes the following steps that: sending, by a source node, a service request message to a second group of nodes via a first group of Diameter routing agent (DRA) nodes, wherein the second group of nodes include: a destination node and a second group of DRA nodes, and first identification information, second identification information and third identification information are carried in the service request message, wherein the first identification information is used for identifying the destination node, the second identification information is used for indicating the first group of DRA nodes to route the service request message according to the first identification information and indicating the destination node to configure first identification information of a service response message to the third identification information, and the third identification information is used for identifying the source node; and acquiring, by the source node, the service response message returned by the destination node via the second group of DRA nodes.

In an example embodiment, the first identification information of the service request message is an Attribute Value Pair (AVP) consisting of a Destination-Realm and a Destination-Host.

In an example embodiment, the third identification information of the service request message is an AVP consisting of an Origin-Realm and an Origin-Host.

In an example embodiment, the second identification information of the service request message is a command flag added in a Diameter message head.

In an example embodiment, during a process of routing, by the first group of DRA nodes, the service request message, each DRA node in the first group of DRA nodes first carries out a route analysis for the service request message and then forwards the service request message to a next adjacent DRA node or the destination node, without at least one of transaction processing and session processing.

In an example embodiment, the first group of DRA nodes and the second group of DRA nodes are two different links between the source node and the destination node, wherein at least one DRA node in the first group of DRA nodes are out of service during a process of routing the service request message.

In another embodiment of the disclosure, a method for routing a response message is provided, and the method for routing the response message routing method includes the following steps that: receiving, by a destination node, a service request message from a source node via a first group of Diameter routing agent (DRA) nodes, wherein first identification information, second identification information and third identification information are carried in the service request message, the first identification information is an identifier of the destination node, the second identification information is used for indicating the first group of DRA nodes to route the service request message according to the first identification information and indicating the destination node to configure first identification information of a service response message to the third identification information, and the third identification information is used for identifying the source node; and configuring, by the destination node, the first identification information of the service response message to the third identification information according to the second identification information and returning, by the destination node, the service response message to the source node via a second group of nodes, wherein the second group of nodes include: the destination node and a second group of DRA nodes.

In an example embodiment, configuring, by the destination node, the first identification information of the service response message to the third identification information of the service request message according to the second identification information includes at least one of the following: configuring, by the destination node, a Destination-Realm carried in the service response message to a Origin-Realm of the source node; and configuring, by the destination node, a Destination-Host carried in the service response message to a Origin-Host of the source node.

In an example embodiment, the second identification information of the service request message is a command flag added in a Diameter message head.

In an example embodiment, during a process of routing, by the second group of nodes, the service response message, each node in the second group of nodes first carries out a route analysis for the service response message and then forwards the service response message to a next adjacent DRA node or the source node according to a result of the route analysis, without at least one of transaction processing and session processing.

In another embodiment of the disclosure, a device for acquiring a response message is provided, and the device for acquiring the response message includes: a sending component arranged to send a service request message to a second group of nodes via a first group of Diameter routing agent (DRA) nodes, wherein the second group of nodes include: a destination node and a second group of DRA nodes; first identification information, second identification information and third identification information are carried in the service request message, wherein the first identification information is used for identifying the destination node, the second identification information is used for indicating the first group of DRA nodes to route the service request message according to the first identification information and indicating the destination node to configure first identification information of a service response message to the third identification information of the service request message, and the third identification information is used for identifying a source node; and an acquisition component arranged to acquire the service response message returned by the destination node via the second group of nodes.

In an example embodiment, the first identification information of the service request message is an Attribute Value Pair (AVP) consisting of a Destination-Realm and a Destination-Host.

In an example embodiment, the third identification information of the service request message is an AVP consisting of an Origin-Realm and an Origin-Host.

In an example embodiment, the second identification information of the service request message is a command flag added in a Diameter message head.

In an example embodiment, during a process of routing, by the first group of DRA nodes, the service request message, each DRA node in the first group of DRA nodes first carries out a route analysis for the service request message and then forwards the service request message to a next adjacent DRA node or the destination node, without at least one of transaction processing and session processing.

In an example embodiment, the first group of DRA nodes and the second group of DRA nodes are two different links between the source node and the destination node, wherein at least one DRA node in the first group of DRA nodes are out of service during a process of routing the service request message.

In another embodiment of the disclosure, a device for routing a response message is provided, and the device for routing the response message includes: a receiving component arranged to receive a service request message from a source node via a first group of Diameter routing agent (DRA) nodes, wherein first identification information, second identification information and third identification information are carried in the service request message, the first identification information of the service request message is an identifier of a destination node, the second identification information is used for indicating the first group of DRA nodes to route the service request message according to the first identification information and indicating the destination node to configure first identification information of a service response message to the third identification information, and the third identification information is used for identifying the source node; and a determination component arranged to configure the first identification information of the service response message to the third identification information according to the second identification information and return the service response message to the source node via a second group of nodes, wherein the second group of nodes include: the destination node and a second group of DRA nodes.

In an example embodiment, the determination component includes: a first processing element arranged to set a Destination-Realm carried in the service response message to a Origin-Realm of the source node; and a second processing element arranged to configure a Destination-Host carried in the service response message to a Origin-Host of the source node.

In an example embodiment, the second identification information of the service request message is a command flag added in a Diameter message head.

In an example embodiment, during a process of routing, by the second group of nodes, the service response message, each node in the second group of nodes first carries out a route analysis for the service response message and then forwards the service response message to a next adjacent DRA node or the source node according to a result of the route analysis, without at least one of transaction processing and session processing.

In another embodiment of the disclosure, a system for acquiring the response message and routing the response message is provided, and the system for acquiring the response message and routing the response message includes: a service source node, a service destination node, a first group of Diameter routing agent (DRA) nodes via which a service request message is sent from the service source node to the service destination node and a second group of DRA nodes via which a service response message is sent from the service destination node to the service source node.

In embodiments of the disclosure, a source node sends a service request message to a second group of nodes via a first group of DRA nodes, wherein the second group of nodes include: a destination node and a second group of DRA nodes; first identification information, second identification information and third identification information are carried in the service request message, wherein the first identification information is used for identifying the destination node, the second identification information is used for indicating the first group of DRA nodes to route the service request message according to the first identification information and indicating the destination node to configure the first identification information of a service response message to the third identification information, and the third identification information is used for identifying the source node, and the source node acquires the service response message returned by the destination node via the second group of DRA nodes. In this way, the embodiments of the disclosure gets rid of the big defect in the problem that a Diameter response message cannot be routed separately is solved through a message resending of a transaction layer or a route reselection scheme and consequentially improves a reliability of a network layer and reduces a dependence on a resent message processing capability of a Diameter server.

BRIEF DESCRIPTION OF THE DRAWINGS

The accompanying drawings described herein which are incorporated into and form a part of the application are provided for the better understanding of the disclosure, and exemplary embodiments of the disclosure and the description of the exemplary embodiments serve to illustrate the present but are not to be construed as improper limitations to the disclosure. In the accompanying drawings.

DETAILED DESCRIPTION OF THE EMBODIMENTS

The disclosure will be described below in detail with reference to accompanying drawings when read in conjunction with specific embodiments. It should be noted that the embodiments of the disclosure and the features thereof can be combined with each other if no conflict is caused.

Figure 1:
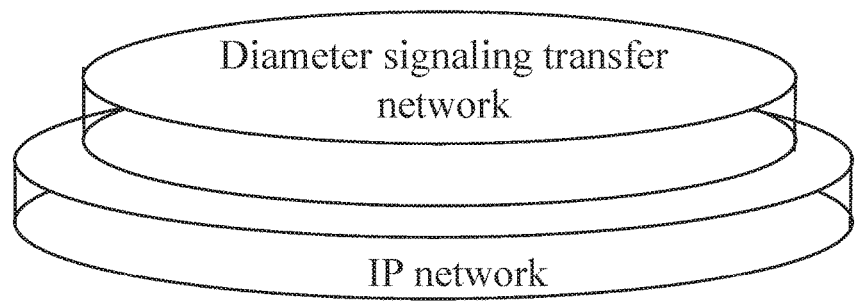
FIG. 1 is a schematic diagram illustrating a construction of a network-over-network (that is, a Diameter signaling transfer network) over an IP network according to the related art.
Figure 2:
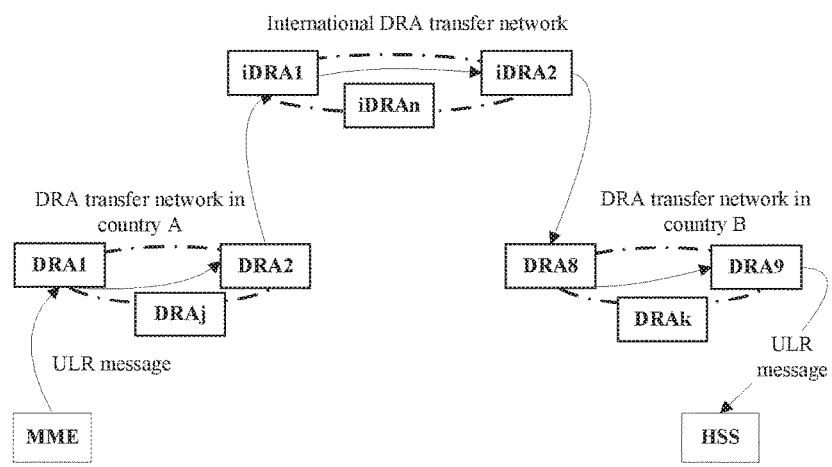
FIG. 2 is a schematic diagram illustrating a division of a Diameter signaling transfer network into an international layer and a domestic layer according to the related art.
Figure 3:
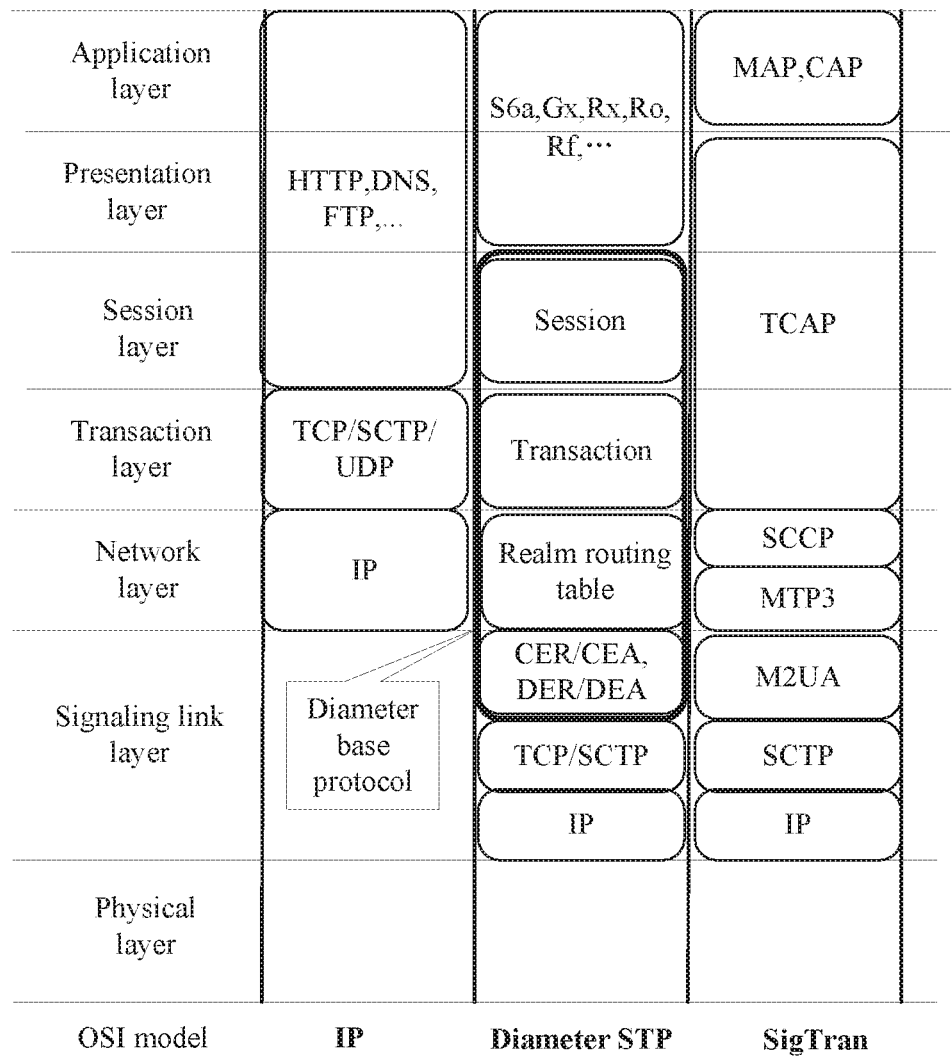
FIG. 3 is a schematic diagram illustrating protocol layers of a DRA network based on an OSI model according to the related art.
Figure 4:
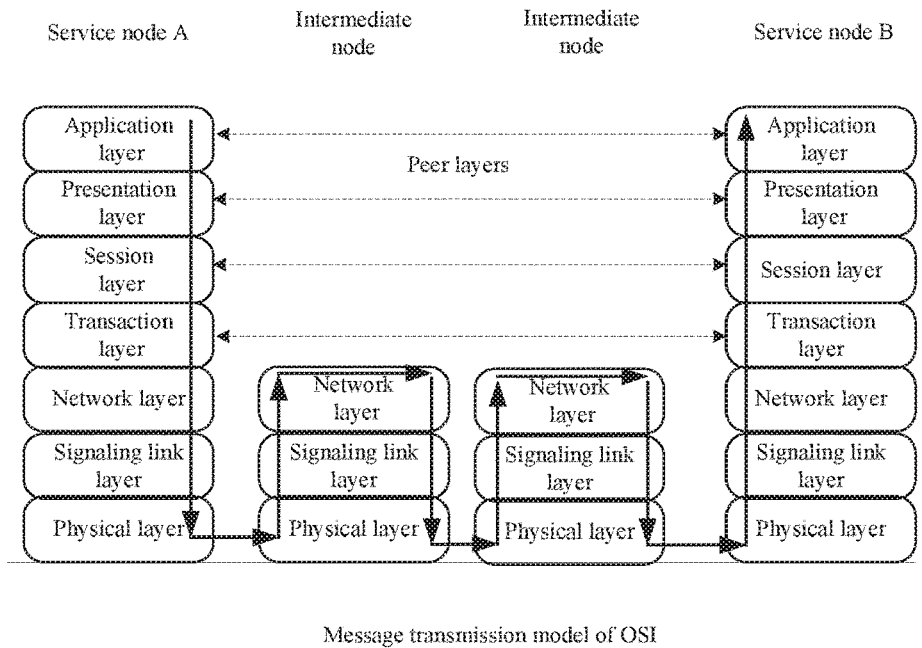
FIG. 4 is a schematic diagram illustrating a standard model for the transfer of a signaling between service nodes based on an OSI model according to the related art.
Figure 5:
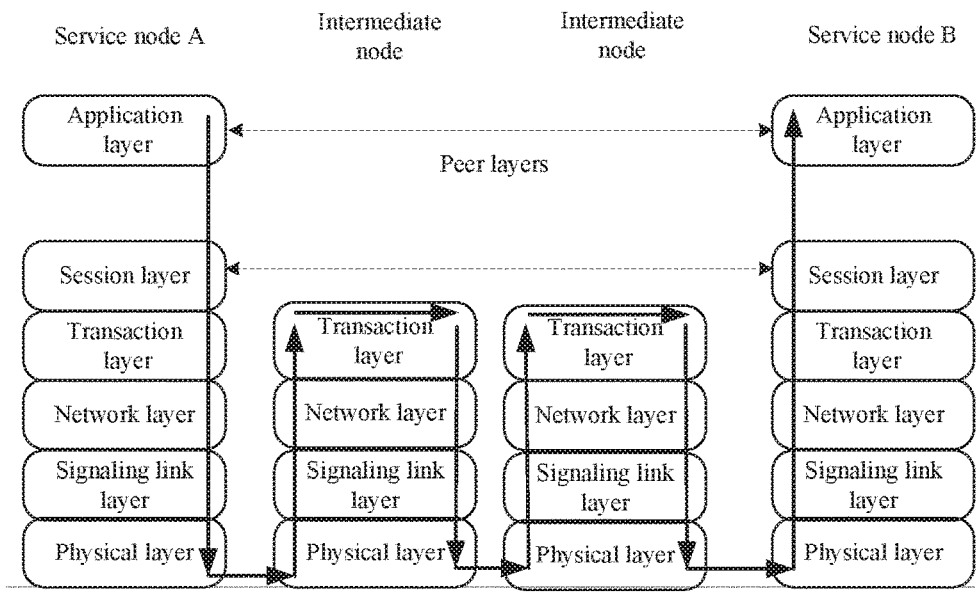
FIG. 5 is a schematic diagram illustrating a signaling transfer mode 1 used in the related art to transfer a signaling between Diameter service nodes through a DRA which only maintains a transaction state.
Figure 6:
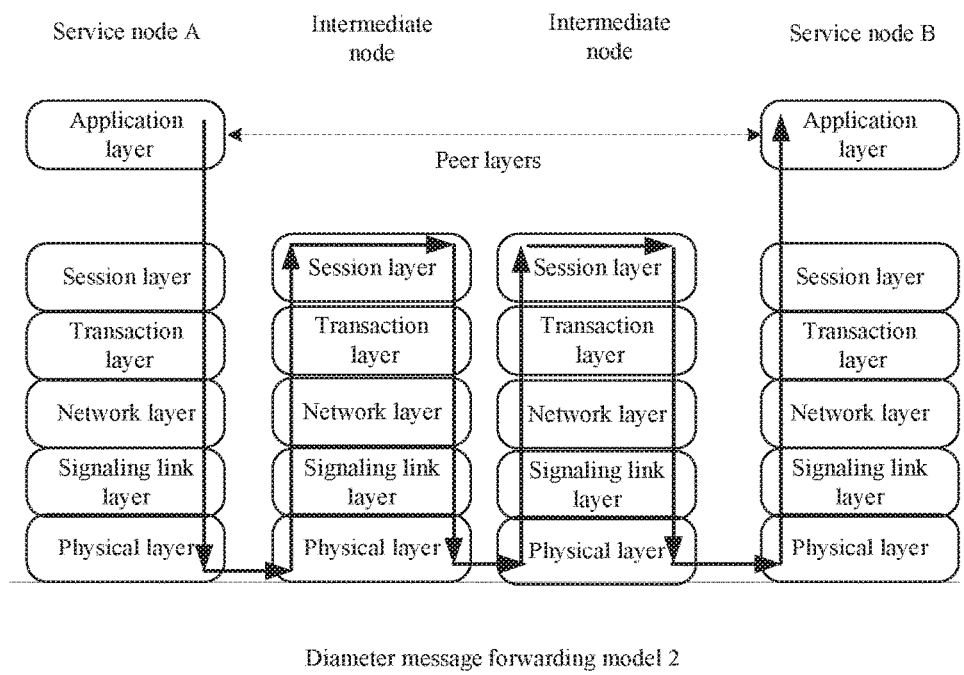
FIG. 6 is a schematic diagram illustrating a signaling transfer mode 2 used in the related art to transfer a signaling between Diameter service nodes through a DRA which only maintains a transaction state and a session state.
Figure 7:
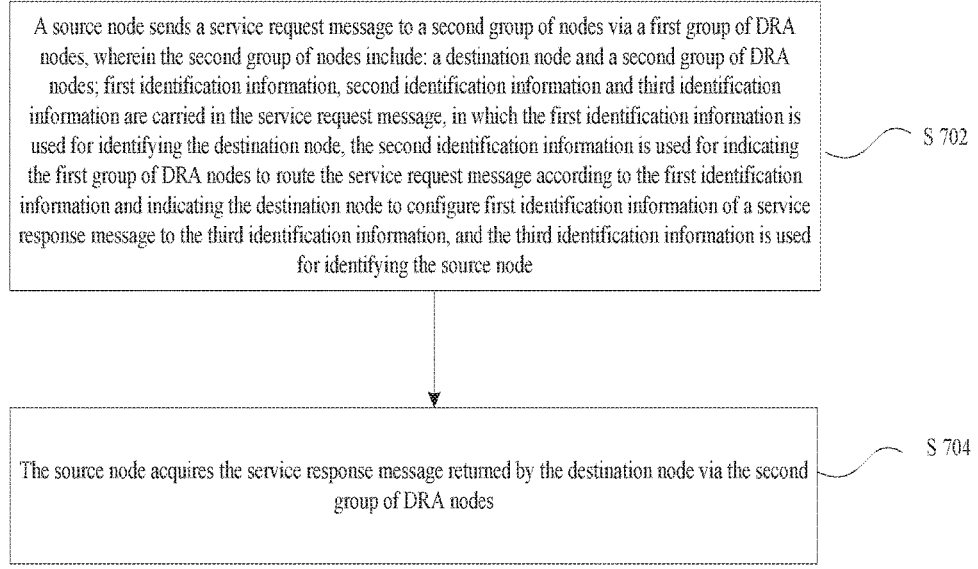
FIG. 7 is a flowchart illustrating a method for acquiring a response message according to an embodiment of the disclosure.

FIG. 7 is a flowchart illustrating a method for acquiring a response message according to an embodiment of the disclosure. As shown in FIG. 7, the method may include the following processing steps:

S702: a source node sends a service request message to a second group of nodes via a first group of DRA nodes, wherein the second group of nodes include: a destination node and a second group of DRA nodes; first identification information, second identification information and third identification information are carried in the service request message, in which the first identification information is used for identifying the destination node, the second identification information is used for indicating the first group of DRA nodes to route the service request message according to the first identification information and indicating the destination node to configure first identification information of a service response message to the third identification information, and the third identification information is used for identifying the source node; and S704: the source node acquires the service response message returned by the destination node via the second group of DRA nodes.

A problem that a Diameter response message cannot be routed separately is solved through a message resending of a transaction layer or a route reselection scheme in the related art has a big defect. By carrying, in a service request message, first identification information for identifying a destination node and second identification information for indicating a first group of DRA nodes to route the service request message according to the first identification information and indicating the destination node to configure first identification information of a service response message to the third identification information of the service request message for identifying a source node, the method shown in FIG. 7 simplifies functions of a DRA serving as a signaling transfer node by taking out a transaction processing and a session processing and consequentially gets rid of the big defect in the problem that a Diameter response message cannot be routed separately is solved through the message resending of the transaction layer or the route reselection scheme, improves the reliability of a network layer and reduces the dependence on the resent message processing capability of a Diameter server.

In an example embodiment, the second identification information of the service request message is a command flag added in a Diameter message head.

In an example embodiment, a flag 'N' may be added in the Diameter message head, the solution provided herein is adopted when the tags 'T' in a request message and a response message are both 1. A received Diameter request/response message is processed in existing way when no flag 'N' is included in the received Diameter request/response message.

Figure 8:
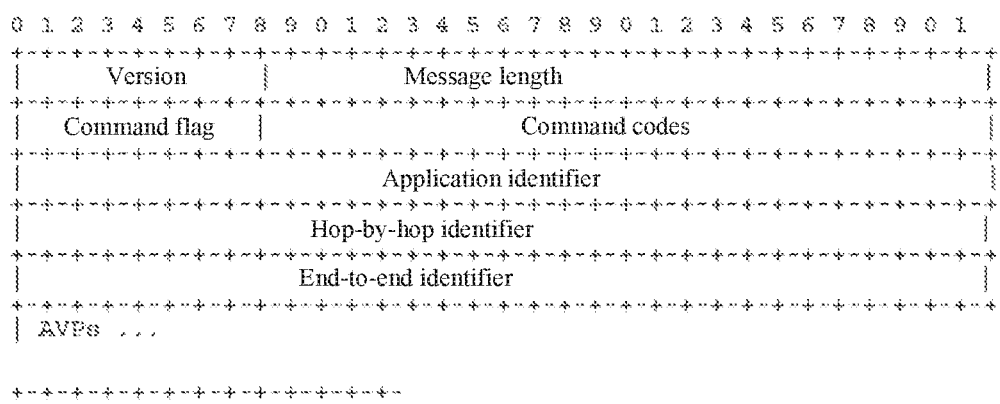
FIG. 8 is a schematic diagram illustrating a definition of a Diameter message head according to an example embodiment of the disclosure.
Figure 9:
FIG. 9 is a schematic diagram illustrating the definition of a command flag according to an example embodiment of the disclosure.

FIG. 8 is a schematic diagram illustrating a definition of a Diameter message head according to an example embodiment of the disclosure. As shown in FIG. 8, refer to RFC 3588, command flags shown in FIG. 8 are defined as in FIG. 9, FIG. 9 is a schematic diagram illustrating a definition of a command flag according to an example embodiment of the disclosure. In FIG. 9, bits 4/5/6/7 of a command flag are all reserved fields, a bit 4 may be defined as 'N', meaning a network.

In an example embodiment, as to a configuring of a command flag 'N' in a Diameter message, when all the Diameter nodes in a network support the solution provided herein, then a command flag 'N' can be set at a Diameter service node; when a certain service node is unsupportive to a flag 'N', then the DRA of the service node is directly used as a DRA gateway node, and a flag 'N' is set when a message is forwarded on the DRA gateway node. Thus, it is not needed to update versions of service nodes. If only the current network supports a flag 'N', then a DRA directly connected with another DRA network (e.g. an international DRA network) is used as a DRA gateway node and no flag 'N' is set when a message is forwarded on the DRA gateway node. Thus, it is not needed to update versions of Diameter nodes of another network.

In an example embodiment, the first identification information of the service request message is an AVP consisting of a Destination-Realm and a Destination-Host.

In an example embodiment, the third identification information of the service request message is an AVP consisting of an Origin-Realm and an Origin-Host.

When a flag 'N' is included in a head of a received Diameter response message, a DRA node carries out a route analysis for the Destination-Realm and the Destination-Host included in the response message and forwards the response message, the AVP carried in the message and consisting of the Destination-Realm and the Destination-Host is forwarded as the message is forwarded.

In an example embodiment, during a process of routing, by the first group of DRA nodes, service request message, each DRA node in the first group of DRA nodes first carries out a route analysis for the service request message and then forwards the service request message to a next adjacent DRA node or the destination node, without at least one of transaction processing and session processing.

When a flag 'N' is included in a head of a received Diameter response message, a DRA node carries out a route analysis and forwards the request message but not maintain the transaction state (or session state), which simplifies functions of the DRA serving as a signaling transfer node by taking out a transaction processing and a session processing. Because a transaction/session resource is taken out, the DRA will not be short of a transaction/session resource or attacked viciously or unintentionally.

In an example implementation process, in a case where a command flag 'N' is included in a Diameter message received by a DRA, the command flag 'N' is processed as follows: when the message is a Diameter request message, that is, the flag 'R' included in the message is 1, then the current DRA acquires a route through a route analysis and forwards the message (including the flag 'N') without maintaining a transaction state or a session state; and when the message is a Diameter response message, that is, the flag 'R' included in the message is 0, the current DRA acquires a route through a route analysis and forwards the message (may include: an AVP consisting of a Destination-Realm and a Destination-Host and a flag 'N').

In an example embodiment, the first group of DRA nodes and the second group of DRA nodes are two different links between the source node and the destination node, in which at least one DRA node in the first group of DRA nodes are out of service during a process of routing the service request message. That is, once a certain DRA is temporarily or permanently out of service, a diameter response message can be forwarded from another node, thus improving the reliability of a network layer.

Figure 10:
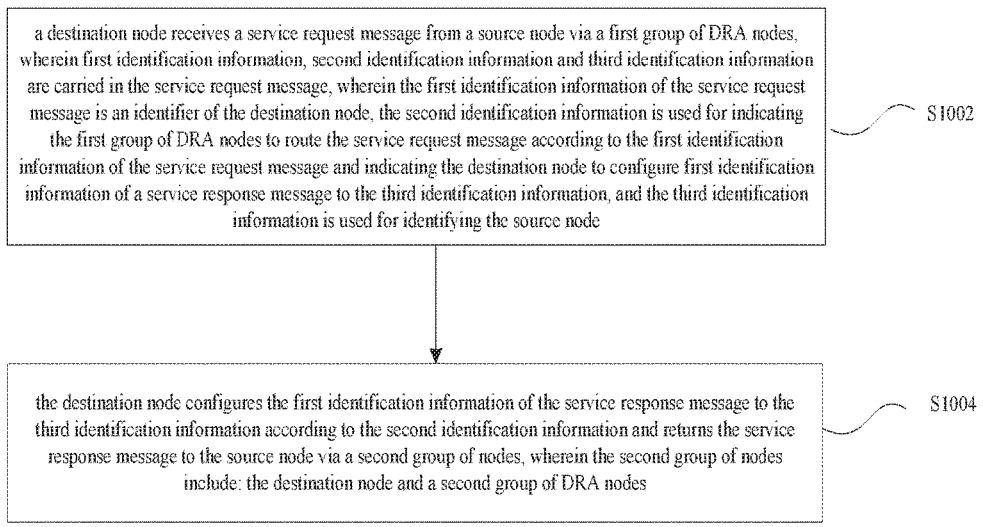
FIG. 10 is a flowchart illustrating a method for routing a response message according to an embodiment of the disclosure.

FIG. 10 is a flowchart illustrating a method for routing a response message according to an embodiment of the disclosure. As shown in FIG. 10, the method may include the following processing steps:

S1002: a destination node receives a service request message from a source node via a first group of DRA nodes, wherein first identification information, second identification information and third identification information are carried in the service request message, wherein the first identification information of the service request message is an identifier of the destination node, the second identification information is used for indicating the first group of DRA nodes to route the service request message according to the first identification information of the service request message and indicating the destination node to configure first identification information of a service response message to the third identification information, and the third identification information is used for identifying the source node; and S1004: the destination node configures the first identification information of the service response message to the third identification information according to the second identification information and returns the service response message to the source node via a second group of nodes, wherein the second group of nodes includes: the destination node and a second group of DRA nodes.

In an example embodiment, in S1004, the process that the destination node configures the first identification information of the service response message to the third identification information of the service request message according to the second identification information may include at least one of the following operations:

S1: the destination node configures a Destination-Realm carried in the service response message to a Origin-Realm of the source node; and S2: the destination node configures a Destination-Host carried in the service response message to a Origin-Host of the source node.

In an example embodiment, an AVP consisting of a Destination-Realm and a Destination-Host is added in each Diameter response (ACK) message for routing the ACK message. When the flag 'N' included in a request message is 1, the node generating a response message configures the Origin-Realm included in the request message to the Destination-Realm of the response message and the Origin-Host included in the request message to the Destination-Host of the response message.

In an example embodiment, during a process of routing, by the second group of nodes, the service response message, each node in the second group of nodes first carries out a route analysis for the service response message and then forwards the service response message to a next adjacent DRA node or the source node according to a result of the route analysis, without at least one of transaction processing and session processing.

The foregoing example implementation process will be described further below with reference to the example implementation modes shown in FIG. 11 and FIG. 16.

Figure 11:
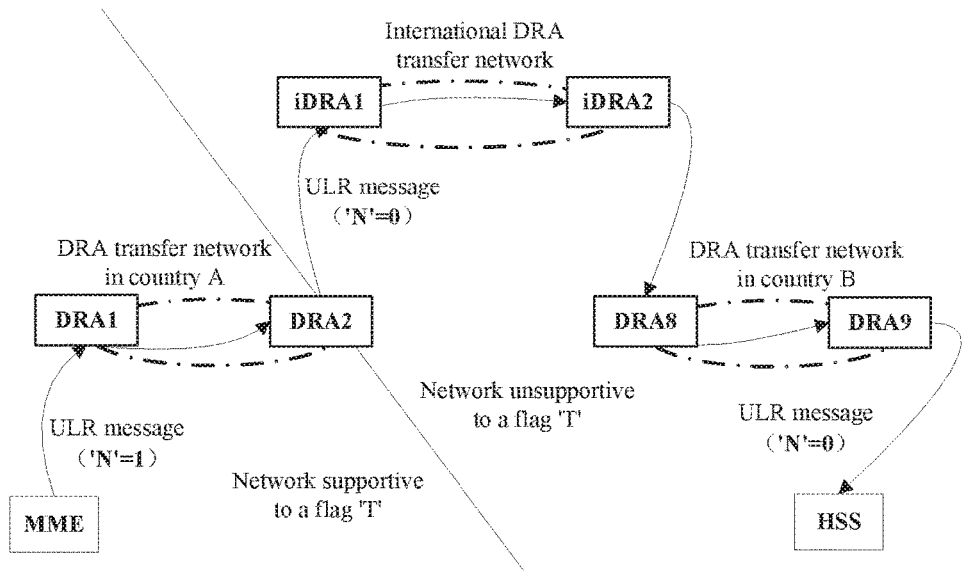
FIG. 11 is a schematic diagram illustrating a construction of a network with DRA gateway agents and an internal network unsupportive to a flag 'N' according to an example embodiment of the disclosure.

FIG. 11 is a schematic diagram illustrating a construction of a network with DRA gateway agents and an internal network unsupportive to a flag 'N' according to an example embodiment of the disclosure. As shown in FIG. 11, as a DRA gateway agent, a DRA2 supports a flag 'N' in a domestic Diameter signaling transfer network which is located below and on a left of the DRA2 in FIG. 11, and each Diameter node located above and on a right of the DRA2 in FIG. 11 is unsupportive to a flag 'N', providing a compatibility with another network unsupportive to the solution provided herein. When a gateway DRA forwards a response message, the DRA2 which serves as a DRA gateway agent can set a Origin-Realm in a received REQ message to a Destination-Realm of an ACK message according to a request message recorded in a transaction data region and a Origin-Host in the received REQ message to the Destination-Host of the ACK message.

Figure 12:
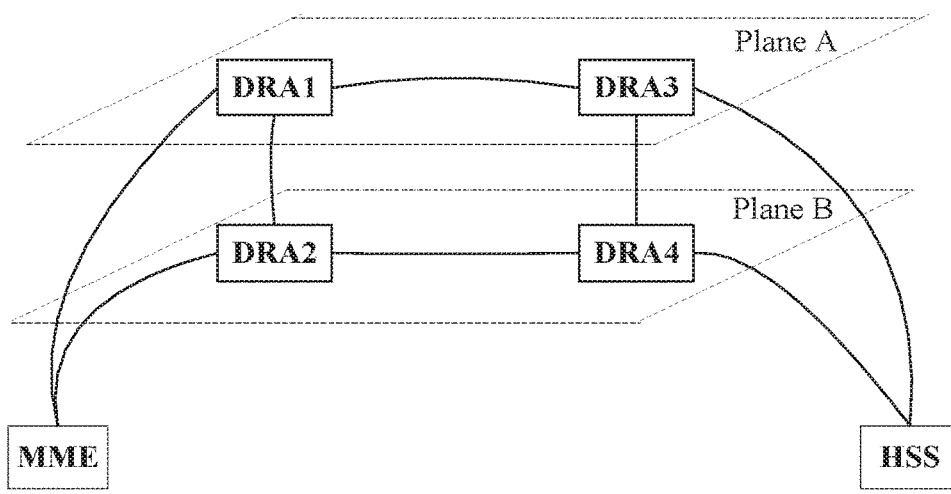
FIG. 12 is a schematic diagram illustrating a construction of a simplest single-layer two-plane network with four DRAs according to an example embodiment of the disclosure.

FIG. 12 is a schematic diagram illustrating a construction of a simplest single-layer two-plane network with four DRAs according to an example embodiment of the disclosure. As shown in FIG. 12, in this network model, when a flag 'N' is 1, each node forwarding a Diameter response message carries out a route analysis to acquire available DRA nodes and forwards a message. A DRA can be divided into plane A and plane B. Each region has a pair of DRAs, each plane having one. Any service node in a region is synchronously connected with a pair of DRAs, thereby forming a load sharing scheme. Each two of the DRAs on the same plane are connected with each other, thus, a Diameter signaling link, the called C link, only exists between a pair of DRAs on two planes.

Figure 13:
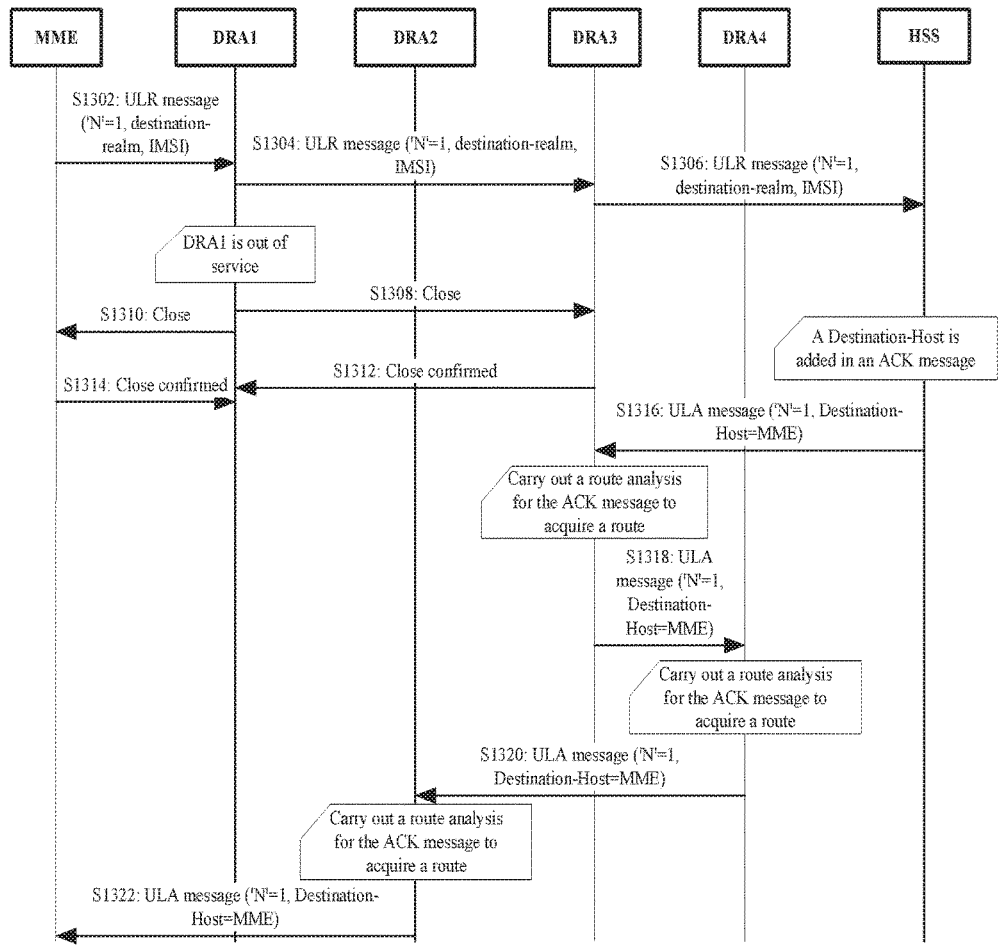
FIG. 13 is a flowchart illustrating a forwarding of a transaction request and a response message when a certain DRA is out of service according to an example embodiment of the disclosure.

FIG. 13 is a flowchart illustrating a forwarding of a transaction request and a response message when a certain DRA is out of service according to example embodiment of the disclosure. As shown in FIG. 13, the flow may include the following processing Steps:

S1302: a user of an MME initiates a registration, and a terminal sends a ULR message to a DRA1, wherein an International Mobile Subscriber Identity (IMSI) and Destination Realm information are carried in the ULR message, and a flag 'N' is set;

S1304: after receiving the ULR message, the DRA1 carries out a route analysis and forwards the ULR message to a DRA 3, and a flag 'N' is set;

S1306: after receiving the message, the DRA3 carries out a route analysis and forwards the message to an HSS, and a flag 'N' is set;

S1308-S1314: because a version of the DRA1 is updated at this time, a SHUTDOWN message is sent on a SCTP association of each Diameter, and the DRA1 is out of service after a SHUTDOWN ACK message is received;

S1316: after receiving the ULR message, the HSS sends a ULA message to the DRA3, a Destination-Host of the ULA message is set to be the MME, and a flag 'N' is set;

S1318: after receiving the ULA message, the DRA3 carries out a route analysis and sends the ULA message to a DRA 4, wherein a flag 'N' is carried in the ULA message;

S1320: after receiving the ULA message, the DRA4 carries out a route analysis and sends the ULA message to the DRA2, wherein a flag 'N' is carried in the ULA message; and S1322: after receiving the ULA message, the DRA2 carries out a route analysis and sends the ULA message to the MME. The transaction on the MME succeeds.

Figure 14:
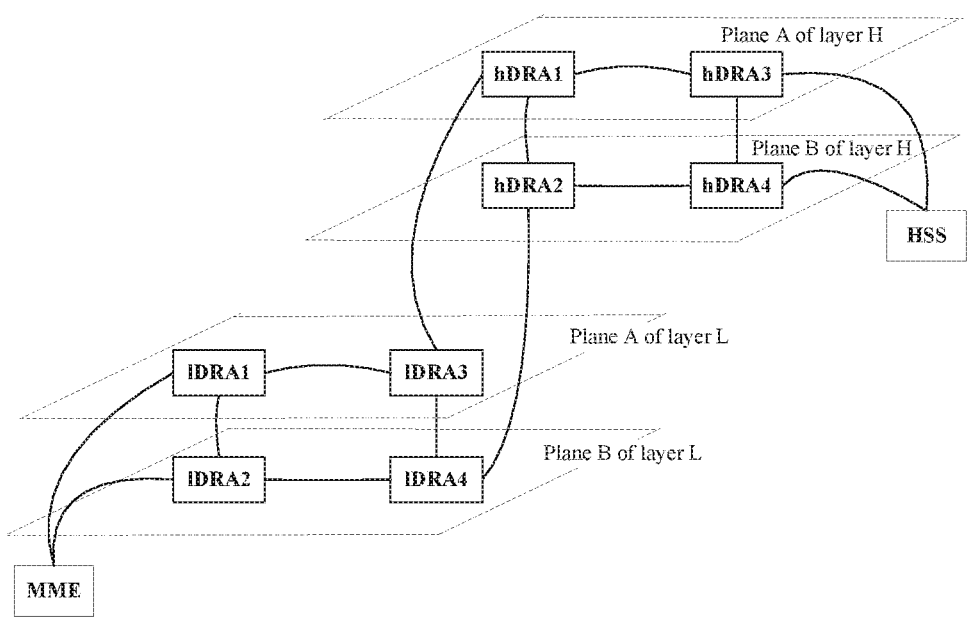
FIG. 14 is a schematic diagram illustrating a construction of a simplest two-layer two-plane network with eight DRAs according to an example embodiment of the disclosure.

FIG. 14 is a schematic diagram illustrating a construction of a simplest two-layer two-plane network with eight DRAs according to an example embodiment of the disclosure. As shown in FIG. 14, a DRA signaling transfer network is divided into two layers: a layer H and a layer L. All regions constitute the layer H, and all the layers in each region constitute the layer L.

The layer L can be divided into plane A and plane B, and each layer has a pair of DRAs, each plane having one. Each service node (e.g. MME) of the layer is synchronously connected with a pair of Low Diameter Routing Agent (LDRA) to form a load sharing scheme. Each two of the LDRAs on the same plane are connected with each other, thus, a Diameter signaling link, the called C link, exists between paired LDRAs on two planes.

The layer H can be divided into plane A and plane B. A region has a pair of DRAs, each plane having one. Each pair of LDRAs in the region is connected with a pair of LDRAs to form a load sharing scheme. Each two of High Diameter Routing Agents (HDRAs) on the same plane are connected with each other, thus, a Diameter signaling link, the called C link, only exists between paired HDRAs on two planes. A service node (e.g. HSS) is synchronously connected with a pair of HDRAs to share load.

Figure 15:
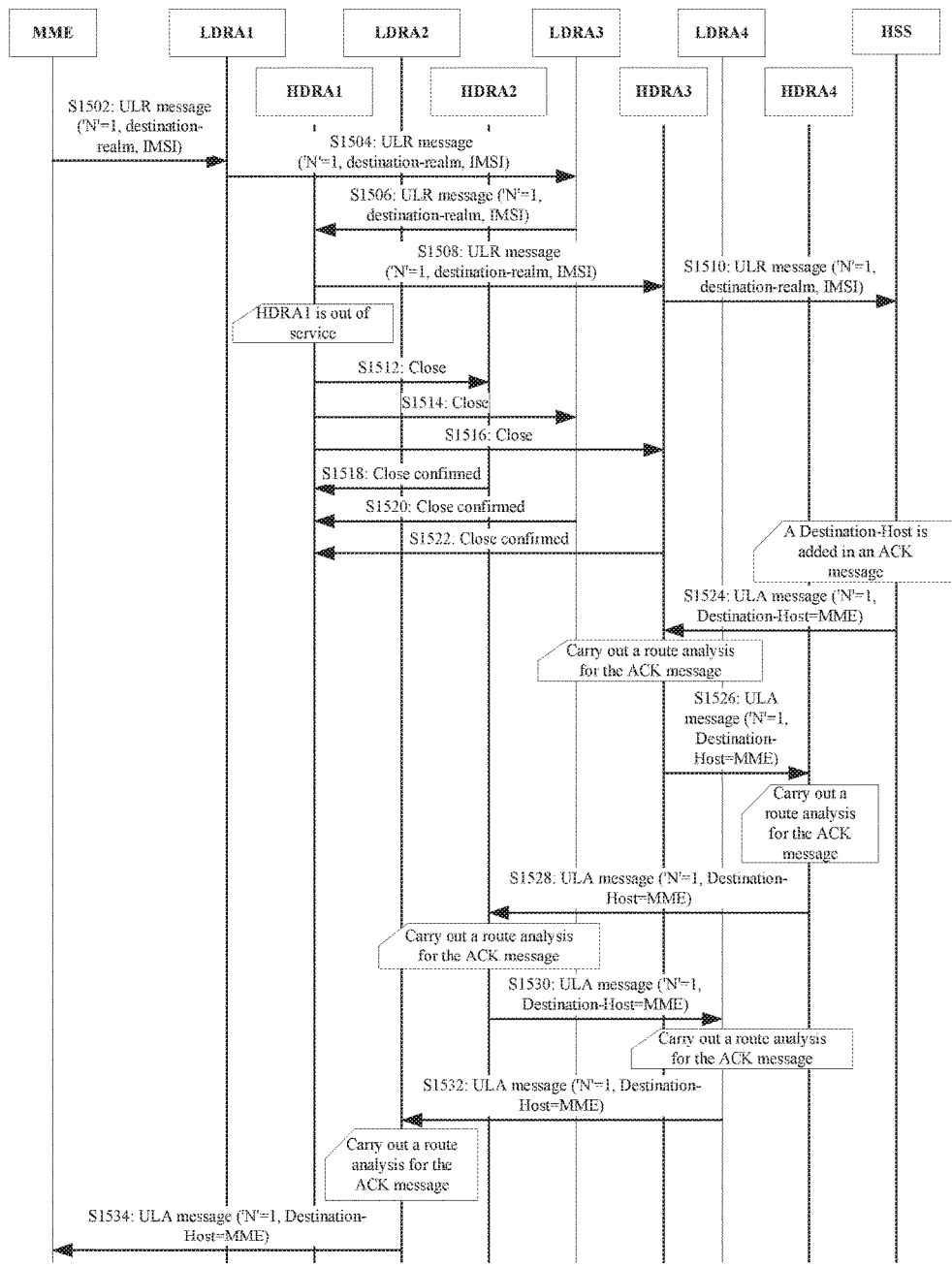
FIG. 15 is a flowchart illustrating the forwarding of a transaction request and a response message when a certain HDRA is out of service according to an example embodiment of the disclosure.

FIG. 15 is a flowchart illustrating a forwarding of a transaction request and a response message when a certain HDRA is out of service according to an example embodiment of the disclosure. As shown in FIG. 15, the flow may include the following processing Steps:

S1502: a user of an MME initiates a registration, and a terminal sends a ULR message to a DRA1, wherein an IMSI and Destination Realm information are carried in the ULR message, and a flag 'N' is set;

S1504: after receiving the message, the DRA1 carries out a route analysis and forwards the message to a DRA 3, and a flag 'N' is set;

S1506: after receiving the message, the DRA3 carries out a route analysis and forwards the message to an HDRA1, and a flag 'N' is set;

S1508: after receiving the message, the HDRA1 carries out a route analysis and forwards the message to an HDRA 3, and a flag 'N' is set;

S1510 after receiving the message, the HDRA3 carries out a route analysis and forwards the message to an HSS, and a flag 'N' is set;

S1512-S1522: because a version of the HDRA1 is updated at this time, a SHUTDOWN message is sent on the SCTP association of each Diameter, and the HDRA1 is out of service after receiving a SHUTDOWN ACK message;

S1524: after receiving the ULR message, the HSS sends a ULA message to the HDRA3, wherein a DestHost of the ULA message is set to be the MME, and a flag 'N' is set;

S1526: after receiving the ULA message, the HDRA3 carries out a route analysis and sends the ULA message to an HDRA 4, wherein a flag 'N' is carried in the ULA message;

S1528: after receiving the ULA message, the HDRA4 carries out a route analysis and sends the ULA message to an HDRA2, wherein a flag 'N' is carried in the ULA message;

S1530: after receiving the ULA message, the HDRA2 carries out a route analysis and sends the ULA message to an LDRA 4, wherein a flag 'N' is carried in the ULA message; and S1532: after receiving the ULA message, the LDRA4 carries out a route analysis and sends the ULA message to an LDRA2, wherein a flag 'N' is carried in the ULA message; and S1534: after receiving the ULA message, the IDRA2 carries out a route analysis and sends the ULA message to the MME. The transaction on the MME succeeds.

Figure 16:
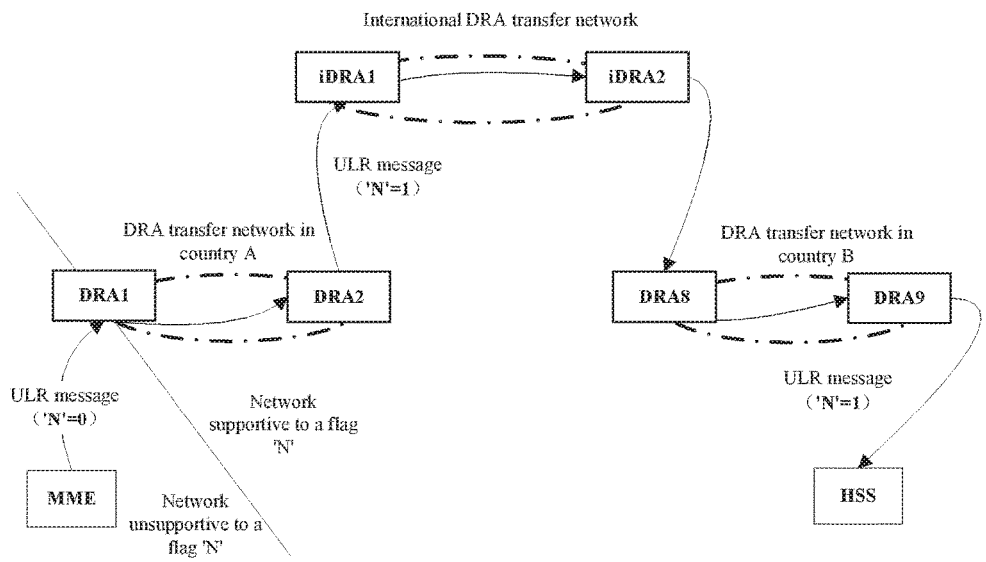
FIG. 16 is a schematic diagram illustrating the construction of a network with DRA gateway agents and service nodes unsupportive to a flag 'N' according to an example embodiment of the disclosure.

FIG. 16 is a schematic diagram illustrating a construction of a network with DRA gateway agents and service nodes unsupportive to a flag 'N' according to an example embodiment of the disclosure. As shown in FIG. 16, an MME node which is located below and on a left of a DRA1 serving as a DRA gateway agent in FIG. 16 is unsupportive to a flag 'N', and each Diameter node located above and on a right of the DRA1 in FIG. 16 supports a flag 'N', providing a compatibility with a service node unsupportive to the solution provided herein.

As the DRA1 needs to maintain a transaction conducted with an MME, a response message is directly returned along the original transaction path recorded on the DRA1, needing no route between the DRA1 and the MME; because the DRA1 does not need to maintain a transaction conducted with a DRA2, a response message is separately routed through a route analysis between the DRA1 and the DRA2. In this way, double identities of the DRA1, serving as a gateway agent, are embodied. The other DRAs excluding for the DRA1 do not need to maintain a transaction state.

Figure 17:
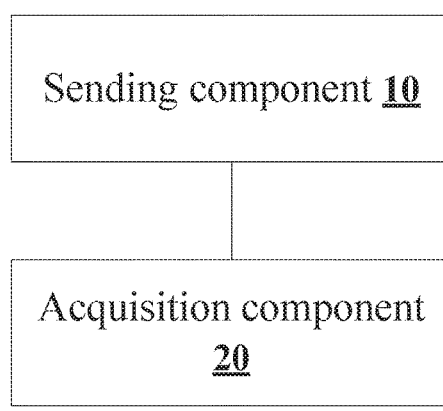
FIG. 17 is a structural block diagram illustrating a device for acquiring a response message according to an embodiment of the disclosure.

FIG. 17 is a structural block diagram illustrating a device for acquiring a response message according to an embodiment of the disclosure. The device can be applied to a source node, and as shown in FIG. 17, the response message acquisition device may include: a sending component 10 arranged to send a service request message to a second group of nodes through a first group of DRA nodes, wherein the second group of nodes include: a destination node and a second group of DRA nodes; first identification information, second identification information and third identification information are carried in the service request message, wherein the first identification information is used for identifying the destination node, the second identification information is used for indicating the first group of DRA nodes to route the service request message according to the first identification information and indicating the destination node to configure the first identification information of a service response message to the third identification information of the service request message, and the third identification information is used for identifying a source node; and an acquisition component 20 arranged to acquire the service response message returned by the destination node through the second group of DRA nodes.

The device shown in FIG. 17 addresses the problem that a diameter response message cannot be routed separately is solved through the message resending of a transaction layer or a route reselection scheme has a big detect and consequentially improves a reliability of a network layer and reduces dependence on a resent message processing capability of a Diameter server.

In an example embodiment, the first identification information of the service request message is an AVP consisting of a Destination-Realm and a Destination-Host.

In an example embodiment, the third identification information of the service request message is an AVP consisting of an Origin-Realm and an Origin-Host.

In an example embodiment, the second identification information of the service request message is a command flag added in a Diameter message head.

In an example embodiment, during a process of routing, by the first group of DRA nodes, the service request message, each DRA node in the first group of DRA nodes first carries out a route analysis for the service request message and then forwards the service request message to a next adjacent DRA node or the destination node, without at least one of transaction processing and session processing.

In an example embodiment, the first group of DRA nodes and the second group of DRA nodes are two different links between the source node and the destination node, in which at least one DRA node in the first group of DRA nodes are out of service during a process of routing the service request message.

Figure 18:
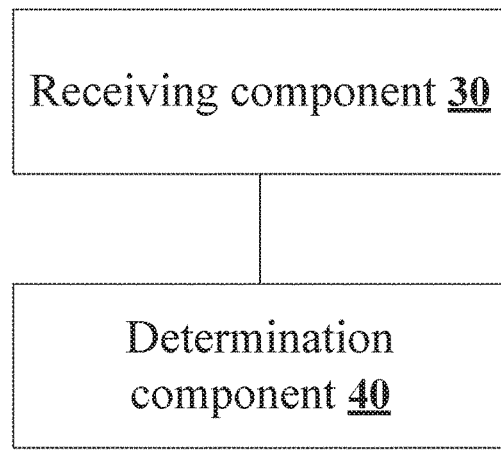
FIG. 18 is a structural block diagram illustrating a device for routing a response message according to an embodiment of the disclosure.

FIG. 18 is a structural block diagram illustrating a device for routing a response message according to an embodiment of the disclosure. As shown in FIG. 18, a response message routing device may include: a receiving component 30 arranged to receive a service request message from a source node through a first group of DRA nodes, wherein first identification information, second identification information and third identification information are carried in the service request message, the first identification information of the service request message is an identifier of a destination node, the second identification information is used for indicating the first group of DRA nodes to route the service request message according to the first identification information and indicating the destination node to configure first identification information of a service response message to the third identification information, and the third identification information is used for identifying the source node; and a determination component 40 arranged to configure the first identification information of the service response message to the third identification information according to the second identification information and return the service response message to the source node via a second group of DRA nodes, wherein the second group of nodes include: the destination node and a second group of DRA nodes.

In an example embodiment, the determination component 40 may include: a first processing element (not shown in FIG. 18) arranged to set a Destination-Realm carried in the service response message to a Origin-Realm of the source node; and a second processing element (not shown in FIG. 18) arranged to set a Destination-Host carried in the service response message to a Origin-Host of the source node.

In an example embodiment, the second identification information of the service request message is a command flag added in a Diameter message head.

In an example embodiment, during a process of routing, by the second group of nodes, the service response message, each node in the second group of nodes first carries out a route analysis for the service response message and then forwards the service response message to a next adjacent DRA node or the source node according to a result of the route analysis, without at least one of transaction processing and session processing.

It should be noted that the device for routing the response message may also be arranged in a DRA node passed by the service response message, but not limited to be arranged in the service destination node.

Figure 19:
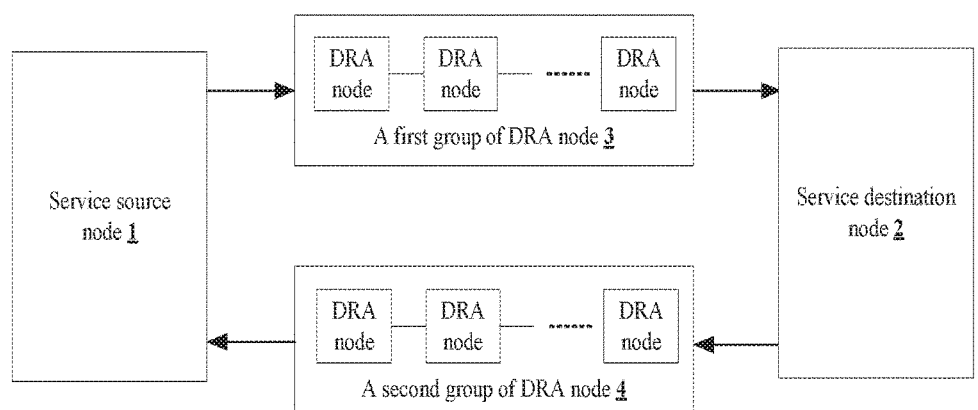
FIG. 19 is a structural block diagram illustrating a system for acquiring a response message and routing the response message according to an embodiment of the disclosure.

FIG. 19 is a structural block diagram illustrating a system for acquiring a response message and routing the response message according to an embodiment of the disclosure. As shown in FIG. 19, system for acquiring a response message and routing the response message may include: a service source node 1, a service destination node 2, a first group of DRA nodes 3 via which a service request message is sent from the service source node to the service destination node and a second group of DRA nodes 4 via which a service response message is sent from the service destination node to the service source node.

The service source node and the service destination node refer to any nodes supporting a Diameter signaling, for example, HSSs, MMEs, PCRFs, PCEFs, BBERFs, OCSs, SGSNs, DRAs and gateway agents.

It can be sent from the foregoing description that the foregoing embodiments realize the following technical effects (it should be noted that these effects may be achieved by some example embodiments): by adopting the solution disclosed herein, when a DRA is used as a signaling transfer node to construct a Diameter signaling network, the DRA for forwarding a message is standardized to provide a perfect network layer function: each message (including: a request REQ message and an Acknowledge ACK message) can be taken as a completely separate message to be routed separately; a management of a transaction layer (and the management of a session layer) is taken out, and when a certain DRA node is out of service, an acknowledgement message is forwarded on a network layer by the network layer but not resent by an upper layer (a transaction layer), thus avoiding defects such as a transaction resource bottleneck and a sharp increase in a network load and consequentially improving a reliability of a signaling transfer network.

Apparently, it should be appreciated by those skilled in the art that each component or step described in the disclosure can be realized by a universal computer and that the components or steps may be integrated on a single computer or distributed on a network consisting of a plurality of computers, optionally, the components or steps may be realized by executable program codes so that the components or steps can be stored in a memory to be executed by a computer, and in some cases, the steps shown or described herein can be executed in a sequence different from this presented herein, or the components or steps are formed into integrated circuit components, or several of the components or steps are formed into integrated circuit components. Therefore, the disclosure is not limited to the combination of specific hardware and software.

Although certain example embodiments of the disclosure have been described above, it should be appreciated that the example embodiments are not described for limiting the disclosure and that a variety of modifications and variations can be devised by those of ordinary skill in the art. Any modification, equivalent substitute and improvement that can be devised by those of ordinary skill in the art without departing from the spirit of the disclosure and that the modifications and improvements shall fall within the protection scope of the disclosure.

INDUSTRIAL APPLICABILITY

As stated above, a method and device for acquiring a response message, a method and device for routing the response message, and a system for acquiring the response message and routing the response message provided herein have the following beneficial effect: the method and device for acquiring the response message, the method and device for routing the response message, and the system for acquiring the response message and routing the response message get rid of the big defect in the problem that a Diameter response message cannot be routed separately is solved through the message resending of a transaction layer or a route reselection scheme, improve a reliability of a network layer and reduce dependence on a resent message processing capability of a Diameter server.

What is claimed is:

1. A method for acquiring a response message, comprising:
sending, by a source node, a service request message to a second group of nodes via a first group of Diameter routing agent (DRA) nodes, wherein the second group of nodes include: a destination node and a second group of DRA nodes, and first identification information, second identification information and third identification information are carried in the service request message, wherein the first identification information is used for identifying the destination node, the second identification information is used for indicating the first group of DRA nodes to route the service request message according to the first identification information and indicating the destination node to configure first identification information of a service response message to the third identification information, and the third identification information is used for identifying the source node; and
acquiring, by the source node, the service response message returned by the destination node via the second group of DRA nodes;
wherein the first group of DRA nodes and the second group of DRA nodes are two different links between the source node and the destination node, wherein at least one DRA node in the first group of DRA nodes are out of service during a process of routing the service request message.

2. The method as claimed in claim 1, wherein the first identification information of the service request message is an Attribute Value Pair (AVP) consisting of a Destination-Realm and a Destination-Host.

3. The method as claimed in claim 1, wherein the third identification information of the service request message is an AVP consisting of an Origin-Realm and an Origin-Host.

4. The method as claimed in claim 1, wherein the second identification information of the service request message is a command flag added in a Diameter message head.

5. The method as claimed in claim 1, wherein during a process of routing, by the first group of DRA nodes, the service request message, each DRA node in the first group of DRA nodes first carries out a route analysis for the service request message and then forwards the service request message to a next adjacent DRA node or the destination node, without at least one of transaction processing and session processing.

6. A method for routing a response message, comprising:
receiving, by a destination node, a service request message from a source node via a first group of Diameter routing agent (DRA) nodes, wherein first identification information, second identification information and third identification information are carried in the service request message, the first identification information is an identifier of the destination node, the second identification information is used for indicating the first group of DRA nodes to route the service request message according to the first identification information and indicating the destination node to configure first identification information of a service response message to the third identification information, and the third identification information is used for identifying the source node; and
configuring, by the destination node, the first identification information of the service response message to the third identification information according to the second identification information and returning, by the destination node, the service response message to the source node via a second group of nodes, wherein the second group of nodes include: the destination node and a second group of DRA nodes;
wherein the first group of DRA nodes and the second group of DRA nodes are two different links between the source node and the destination node, wherein at least one DRA node in the first group of DRA nodes are out of service during a process of routing the service request message.

7. The method as claimed in claim 6, wherein configuring, by the destination node, the first identification information of the service response message to the third identification information of the service request message according to the second identification information comprises at least one of the following:
  configuring, by the destination node, a Destination-Realm carried in the service response message to a Origin-Realm of the source node; and
  configuring, by the destination node, a Destination-Host carried in the service response message to a Origin-Host of the source node.

8. The method as claimed in claim 6, wherein the second identification information of the service request message is a command flag added in a Diameter message head.

9. The method as claimed in claim 6, wherein during a process of routing, by the second group of nodes, the service response message, each node in the second group of nodes first carries out a route analysis for the service response message and then forwards the service response message to a next adjacent DRA node or the source node according to a result of the route analysis, without at least one of transaction processing and session processing.

10. A device for acquiring a response message, comprising:
  a hardware processor coupled with a memory and configured to execute program components stored on the memory, wherein the program components comprise:
  a sending component arranged to send a service request message to a second group of nodes via a first group of Diameter routing agent (DRA) nodes, wherein the second group of nodes include: a destination node and a second group of DRA nodes; first identification information, second identification information and third identification information are carried in the service request message, wherein the first identification information is used for identifying the destination node, the second identification information is used for indicating the first group of DRA nodes to route the service request message according to the first identification information and indicating the destination node to configure first identification information of a service response message to the third identification information of the service request message, and the third identification information is used for identifying a source node; and
  an acquisition component arranged to acquire the service response message returned by the destination node via the second group of nodes;
  wherein the first group of DRA nodes and the second group of DRA nodes are two different links between the source node and the destination node, wherein at least one DRA node in the first group of DRA nodes are out of service during a process of routing the service request message.

11. The device as claimed in claim 10, wherein the first identification information of the service request message is an Attribute Value Pair (AVP) consisting of a Destination-Realm and a Destination-Host.

12. The device as claimed in claim 10, wherein the third identification information of the service request message is an AVP consisting of an Origin-Realm and an Origin-Host; or the second identification information of the service request message is a command flag added in a Diameter message head.

13. The device as claimed in claim 10, wherein during a process of routing, by the first group of DRA nodes, the service request message, each DRA node in the first group of DRA nodes first carries out a route analysis for the service request message and then forwards the service request message to a next adjacent DRA node or the destination node, without at least one of transaction processing and session processing.

14. A device for routing a response message, comprising:
  a hardware processor coupled with a memory and configured to execute program components stored on the memory, wherein the program components comprise:
  a receiving component arranged to receive a service request message from a source node via a first group of Diameter routing agent (DRA) nodes, wherein first identification information, second identification information and third identification information are carried in the service request message, the first identification information of the service request message is an identifier of a destination node, the second identification information is used for indicating the first group of DRA nodes to route the service request message according to the first identification information and indicating the destination node to configure first identification information of a service response message to the third identification information, and the third identification information is used for identifying the source node; and
  a determination component arranged to configure the first identification information of the service response message to the third identification information according to the second identification information and return the service response message to the source node via a second group of nodes, wherein the second group of nodes include: the destination node and a second group of DRA nodes;
  wherein the first group of DRA nodes and the second group of DRA nodes are two different links between the source node and the destination node, wherein at least one DRA node in the first group of DRA nodes are out of service during a process of routing the service request message.

15. The device as claimed in claim 14, wherein the determination component comprises:
  a first processing element arranged to set a Destination-Realm carried in the service response message to a Origin-Realm of the source node; and
  a second processing element arranged to configure a Destination-Host carried in the service response message to a Origin-Host of the source node.

16. The device as claimed in claim 14, wherein the second identification information of the service request message is a command flag added in a Diameter message head.

17. The device as claimed in claim 14, wherein during a process of routing, by the second group of nodes, the service response message, each node in the second group of nodes first carries out a route analysis for the service response message and then forwards the service response message to a next adjacent DRA node or the source node according to a result of the route analysis, without at least one of transaction processing and session processing.

18. A system for acquiring a response message and routing the response message, comprising:
  a service source node, a service destination node, a first group of Diameter routing agent (DRA) nodes via which a service request message is sent from the service source node to the service destination node and a second group of DRA nodes via which a service response message is sent from the service destination node to the service source node;
  wherein the second group of nodes includes: a destination node and a second group of DRA nodes, and first identification information, second identification information and third identification information are carried in the service request message, wherein the first identification information is used for identifying the destination node, the second identification information is used for indicating the first group of DRA nodes to route the service request message according to the first identification information and indicating the destination node to configure first identification information of a service response message to the third identification information, and the third identification information is used for identifying the source node;

wherein the first group of DRA nodes and the second group of DRA nodes are two different links between the source node and the destination node, wherein at least one DRA node in the first group of DRA nodes are out of service during a process of routing the service request message.

\* \* \* \* \*